United States Patent
Yonekawa et al.

(10) Patent No.: US 10,351,680 B2
(45) Date of Patent: Jul. 16, 2019

(54) FORMED BODY HAVING A LAYER OF THERMOPLASTIC RESIN

(71) Applicant: TOYO SEIKAN GROUP HOLDINGS, LTD., Tokyo (JP)

(72) Inventors: Yuhei Yonekawa, Kanagawa (JP); Daisuke Tsuchimoto, Kanagawa (JP); Hiroaki Kikuchi, Kanagawa (JP); Takayuki Ishihara, Kanagawa (JP)

(73) Assignees: NIPPON CLOSURES CO., LTD., Tokyo (JP); TOYO SEIKAN GROUP HOLDINGS, LTD., Tokyo (JP)

( * ) Notice: Subject to any disclaimer, the term of this patent is extended or adjusted under 35 U.S.C. 154(b) by 89 days.

(21) Appl. No.: 14/781,142

(22) PCT Filed: Apr. 3, 2014

(86) PCT No.: PCT/JP2014/059863
§ 371 (c)(1),
(2) Date: Sep. 29, 2015

(87) PCT Pub. No.: WO2014/163149
PCT Pub. Date: Oct. 9, 2014

(65) Prior Publication Data
US 2016/0060402 A1    Mar. 3, 2016

(30) Foreign Application Priority Data

Apr. 4, 2013  (JP) ................................. 2013-078948

(51) Int. Cl.
| C08J 5/00 | (2006.01) |
| C08J 5/18 | (2006.01) |
| C08L 29/04 | (2006.01) |
| C08L 101/00 | (2006.01) |

(52) U.S. Cl.
CPC . C08J 5/00 (2013.01); C08J 5/18 (2013.01); C08L 29/04 (2013.01); C08L 101/00 (2013.01); *C08J 2323/12* (2013.01); *C08J 2329/06* (2013.01); *C08J 2423/12* (2013.01); *C08J 2429/06* (2013.01)

(58) Field of Classification Search
CPC ........................................................ C08J 5/00
See application file for complete search history.

(56) References Cited

U.S. PATENT DOCUMENTS

| 3,857,754 A | 12/1974 | Hirata et al. |
| 3,975,463 A | 8/1976 | Hirata et al. |
| 6,388,007 B1 | 5/2002 | Nakatsukasa et al. |
| 2011/0020626 A1 | 1/2011 | Okamoto et al. |

FOREIGN PATENT DOCUMENTS

| CN | 1184827 | 6/1998 | |
| CN | 102007179 | 4/2011 | |
| EP | 0 522 166 | 1/1993 | |
| EP | 0 940 438 | 9/1999 | |
| JP | 48-75646 | 10/1973 | |
| JP | 10-204229 | 8/1998 | |
| JP | 2002-249595 | 9/2002 | |
| JP | 2002249595 | * 9/2002 | |
| JP | 2003-192016 | 7/2003 | |
| JP | 2003-520284 | 7/2003 | |
| JP | 2003192016 | * 7/2003 | |

OTHER PUBLICATIONS

EVOH flyer, 1996.*
Chinese Office Action issued in Family Member Patent Appl. No. 201480031616.3, dated Dec. 19, 2016.
European Search Report issued in Patent Application No. 14779464.8, dated Oct. 5, 2016.
International Search Report issued in International Patent Application No. PCT/JP2014/059863, dated May 13, 2014.

* cited by examiner

*Primary Examiner* — Irina Krylova
(74) *Attorney, Agent, or Firm* — Greenblum & Bernstein, P.L.C.

(57) ABSTRACT

A formed body having a layer of a resin composition constituted by a thermoplastic resin and a barrier resin, wherein the layer of the resin composition forms, in a matrix of the thermoplastic resin, a layer structure in which the barrier resin is dispersed in the form of a lamellar dispersion phase stretching in one direction; and the ratio (a)/(b) of an aspect ratio (a) of the dispersion phase of the barrier resin near the surfaces of the layer and an aspect ratio (b) of the dispersion phase of the barrier resin in the central portion in the direction of thickness of the layer, is not more than 2.0. The formed body has the layer of the resin composition constituted by the thermoplastic resin and the barrier resin, and has a dispersion structure capable of exhibiting excellent barrier property despite of the single layer.

3 Claims, 4 Drawing Sheets

(A-1)

(A-2)

(A-3)

(B-1)

(B-2)

(B-3)

FORMED BODY HAVING A LAYER OF THERMOPLASTIC RESIN

TECHNICAL FIELD

This invention relates to a formed body having a layer of a thermoplastic resin. More specifically, the invention relates to a formed body having a dispersed structure in which a lamellar barrier resin is stretching in one direction in the thermoplastic resin over the whole formed body in the direction of thickness thereof, featuring excellent barrier property.

BACKGROUND ART

Owing to their excellent flexibility and hygiene property, the thermoplastic resins have heretofore been widely used as packing materials. The thermoplastic resins, however, permit gases such as oxygen and carbonic acid gas to permeate through to a large extent causing, therefore, the containers made from the thermoplastic resins to be incapable of storing foods for extended periods of time.

To compensate for such a defect of the thermoplastic resins, therefore, there have been proposed a variety of multilayered formed bodies combining the layers of the thermoplastic resins with a layer of a barrier resin such as ethylene-vinyl alcohol copolymer or the like. Depending on the form and the method of producing the formed bodies of the multilayered structure, however, it becomes necessary to install new facilities or to increase the number of the forming steps resulting, however, in an increase in the cost of production and without still satisfying the requirements in regard to productivity and economy.

There have also been known resin compositions obtained by blending the thermoplastic resins with barrier resins such as ethylene-vinyl alcohol copolymer and the like. For instance, the following patent documents 1 and 2 are proposing multilayered hollow containers provided with a barrier layer of a resin composition that comprises a polyolefin resin and an ethylene-vinyl alcohol copolymer.

PRIOR ART DOCUMENTS

Patent Documents

Patent document 1: JP-A-48-75646
Patent document 2: JP-A-2003-192016

OUTLINE OF THE INVENTION

Problems that the Invention is to Solve

However, the barrier property is not obtained to a satisfactory degree despite the thermoplastic resin is simply blended with the barrier resin. Here, if the barrier resin is added in an increased amount in an attempt to improve the barrier property, then the cost of the material increases. Therefore, this is not advantageous in economy. Besides, the adhesion among the layers becomes poor if it is attempted to obtain the formed body in a multilayered structure by forming the intermediate layer using the above blend and by forming the inner and outer layers using the thermoplastic resin.

Further, to form a specific dispersion structure in the resin compositions of blends of the thermoplastic resins and the barrier resins described in the above patent documents 1 and 2, it becomes necessary to finely control the forming conditions such as the resin temperature, pressure, flow rate of the resin and the like at the time of the melt forming, bringing about disadvantage in the productivity and economy. Besides, the dispersion structures are not capable of attaining the barrier property to a satisfactory degree.

It is, therefore, an object of the present invention to provide a formed body having a layer of a resin composition constituted by a thermoplastic resin and a barrier resin, the formed body reliably forming a dispersion structure as desired to exhibit excellent barrier property.

Means for Solving the Problems

According to the present invention, there is provided a formed body having a layer of a resin composition constituted by a thermoplastic resin and a barrier resin, wherein:

the layer of the resin composition forms, in a matrix of the thermoplastic resin, a layer structure in which the barrier resin is dispersed in the form of a lamellar dispersion phase stretching in one direction; and the ratio (a)/(b) of an aspect ratio (a) of the dispersion phase of the barrier resin near the surfaces of the layer and an aspect ratio (b) of the dispersion phase of the barrier resin in the central portion in the direction of thickness of the layer, is not more than 2.0.

In the formed body of the present invention, it is desired that:
1. The aspect ratio (b) is 1.6 to 3.0;
2. The aspect ratio (a) is 2.5 to 4.0;
3. The ratio (MFRb/MFRm) of a melt flow rate (MFRb) of the barrier resin and a melt flow rate (MFRm) of the thermoplastic resin is 11 to 200;
4. The melt flow rate (MFRm) of the thermoplastic resin is 0.5 to 25 g/10 min., while the melt flow rate (MFRb) of the barrier resin is 3 to 100 g/10 min.;
5. The resin composition is blended with the barrier resin in an amount of 30 to 300 parts by weight per 100 parts by weight of the thermoplastic resin;
6. The thermoplastic resin is a polyolefin;
7. The barrier resin is an ethylene-vinyl alcohol copolymer (hereinafter often referred to as "EVOH"); and
8. The formed body is obtained by injection-forming the resin composition.

Here, in the specification, the melt flow rate (hereinafter often referred to as "MFR") was measured under the conditions of a temperature of 230° C. and a load of 2160 g in compliance with the JIS K7210.

Effects of the Invention

In the barrier layer of the resin composition in the formed body of the present invention, the thermoplastic resin and the barrier resin are forming the dispersion structure as described above thereby exhibiting excellent barrier property.

In the formed body comprising the resin composition of the invention containing the barrier resin in an amount in a specific range relative to the thermoplastic resin that serves as the matrix, it was discovered that excellent barrier property is exhibited as shown in FIG. 1, since a dispersion phase 2 of a lamellar barrier resin stretching in one direction is formed in the matrix 1 of the thermoplastic resin, and since aspect ratios over the above-mentioned ranges are possessed by the surface layer portions (FIG. 1(A-2)) and by the central portion (FIG. 1(A-3)) in the direction of thickness of the layer of the formed body. That is, in the dispersion structure in the formed body comprising a conventional resin composition as shown in FIG. 2, a lamellar dispersion phase 2 is formed in the surface layer portions (FIG. 2(B-2)) but a dispersion phase 3 of a circular shape is also formed in the central portion (FIG. 2(B-3)). In the present invention, on the other hand, a dispersion phase of the barrier resin is formed in a lamellar shape stretching in one direction over the whole layer in the direction of thickness thereof. As a result, the gas that has permeated is caused to detour over the whole layer in the direction of thickness thereof, and more excellent barrier property is obtained.

The above-mentioned actions and effects of the invention will also become obvious from the results of Examples described later.

That is, the formed bodies of the present invention exhibit excellent barrier property and formability (Examples 1 to 8). Despite the ratios of blending the thermoplastic resin and the barrier resin are within the range of the present invention, however, the barrier property becomes obviously inferior to that of the formed bodies of the present invention if the aspect ratios in the central portion of the formed bodies in the direction of thickness thereof are smaller than the above range (Comparative Examples 1, 2 and 4) or if the ratio of an aspect ratios of the dispersion phase in the surface layer portions and the aspect ratios of the dispersion phase in the central portion are larger than the above range (Comparative Examples 1 to 4).

In studying the resin composition containing the barrier resin in amounts in the range as described above, further, it was discovered that upon using the thermoplastic resin and the barrier resin, a difference in the flow rate of the resin increases between the central portion and the surface layer portion in the resin flow passage at the time of forming if the ratio of MFR of the thermoplastic resin that serves as the matrix and the MFR of the barrier resin is set to lie in a range of 11 to 200 and, as a result, the dispersion phase of the barrier resin greatly stretches in the direction of flow of the resin in the central portion, too.

That is, as shown in FIG. 3, the formed bodies were measured for their oxygen permeation rates, the formed bodies comprising resin compositions obtained by blending a polypropylene with ethylene-vinyl alcohol copolymers of dissimilar MFR in different amounts. The formed body comprising the resin composition blended with the ethylene-vinyl alcohol copolymer having a high MFR exhibited improved barrier property compared to that of the formed body comprising the resin composition blended with the ethylene-vinyl alcohol copolymer having a low MFR over a range of the amount of the ethylene-vinyl alcohol copolymer of 18 to 80% by weight.

As shown in FIG. 5, further, when the high-density polyethylene was used as the thermoplastic resin instead of the polypropylene, too, the formed body comprising the resin composition blended with the ethylene-vinyl alcohol copolymer having a high MFR exhibited improved barrier property compared to that of the formed body comprising the resin composition blended with the ethylene-vinyl alcohol copolymer having a low MFR.

Figure 1:
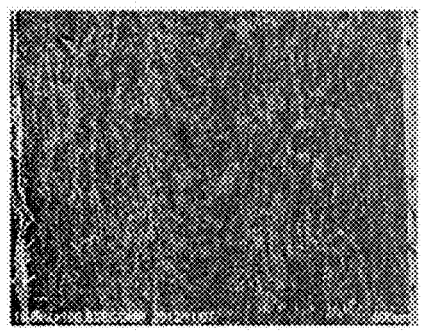
FIG. 1 is a photograph of a cross section of a formed body of a resin composition of the present invention illustrating the dispersion structure in the direction of thickness thereof, wherein (A-1) shows the formed body as a whole, (A-2) is a photograph of the surface layer portion on an enlarged scale, and (A-3) is a photograph of the central portion on an enlarged scale.
Figure 1:
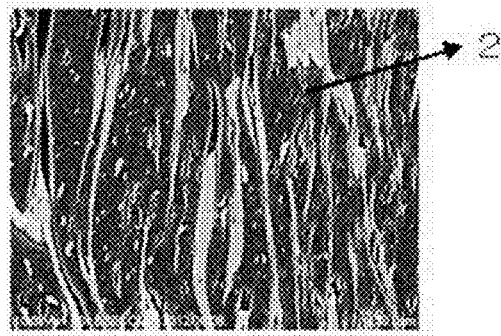
Figure 1:
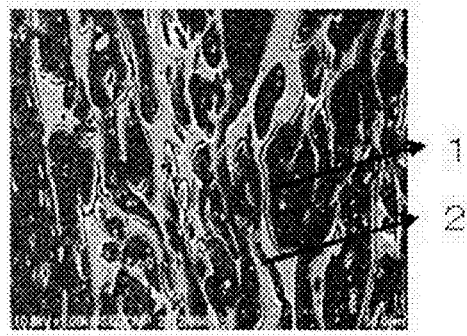
Figure 2:
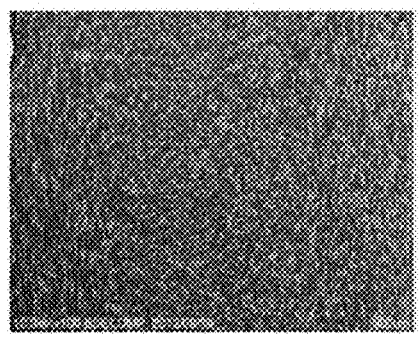
FIG. 2 is a photograph of a cross section of a formed body of a conventional resin composition illustrating the dispersion structure in the direction of thickness thereof, wherein (B-1) shows the formed body as a whole, (B-2) is a photograph of the surface layer portion on an enlarged scale, and (B-3) is a photograph of the central portion on an enlarged scale.
Figure 2:
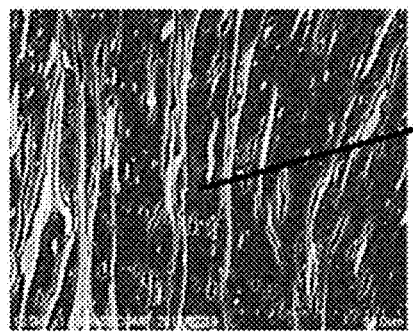
Figure 2:
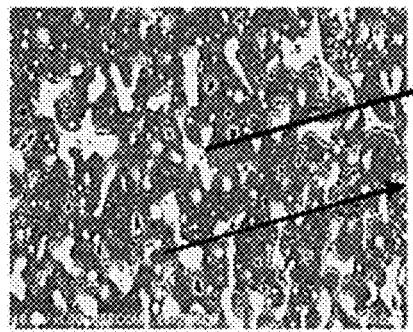
Figure 3:
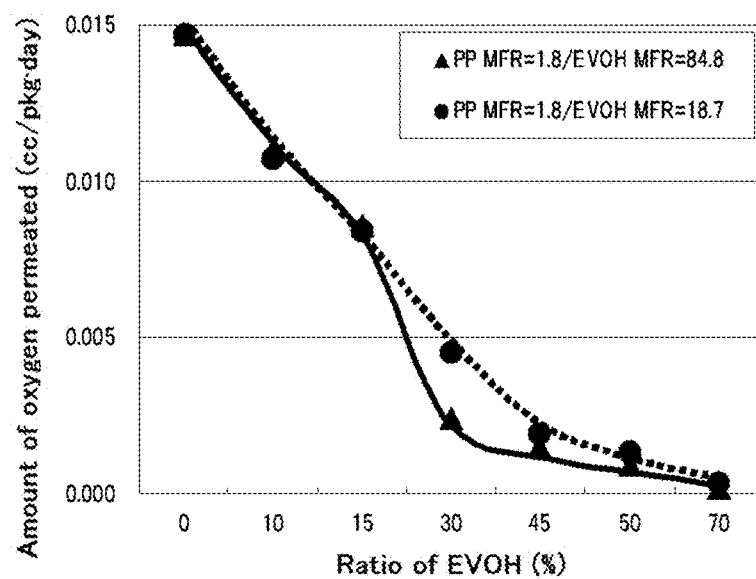
FIG. 3 is a graph showing relationships between the amount of the EVOH and the oxygen permeability using the formed bodies comprising the polypropylene resin compositions that contain EVOH having different MFR in different amounts.

MODES FOR CARRYING OUT THE INVENTION (Thermoplastic Resins)

It is desired that the thermoplastic resin that serves as the matrix in the formed body of the present invention has an MFR in a range of 0.1 to 29 g/10 min. and, specifically, 0.5 to 25 g/10 min. from the standpoint of formability, and it is also important to so select the thermoplastic resin that the ratio of MFR thereof to the MFR of a barrier resin that will be described later is in a range of 11 to 200 from the standpoint of forming the dispersion structure.

As the thermoplastic resin, there can be used those that have heretofore been widely used for the packing materials. Namely, there can be exemplified polyolefin resins such as low-, medium- or high-density polyethylene, polypropylene, ethylene-propylene copolymer, ethylene-vinyl acetate copolymer (EVA), saponified product of EVA, ethylene-ethyl acrylate copolymer (EEA), and ionically crosslinked olefin copolymer (ionomer); aromatic vinyl copolymers such as polystyrene and styrene-butadiene copolymer; halogenated vinyl polymers such as polyvinyl chloride and vinylidene chloride; nitrile polymers such as polyacrylic resin, acrylonitrile-styrene copolymer, and acrylonitrile-styrene-butadiene copolymer; polyester resins such as polyethylene terephthalate, polytrimethylene terephthalate, polybutylene terephthalate and polyethylene naphthalate; polyacetals such as polycarbonate, fluorine-contained resin and polyoxymethylene; and biodegradable resins such as polybutylene succinate, polyethylene succinate, polyhydroxybutylate, polycaprolactone and polylactic acid.

As a preferred polyolefin resin, there can be exemplified low-density polyethylene (LDPE), medium-density polyethylene (MDPE), high-density polyethylene (HDPE), linear low-density polyethylene (LLDPE), linear very low-density polyethylene (LVLDPE), isotactic or syndiotactic polypropylene (PP), propylene copolymer, polybutene-1, ethylene-butene-1 copolymer, ethylene-vinyl acetate copolymer, ionically crosslinked olefin copolymer (ionomer) or blends thereof. It is also allowable to use an acid-modified olefin resin obtained by using the above polyolefin resin as a base polymer, and graft-modifying it with an unsaturated carboxylic acid or derivatives thereof.

The most preferred polyolefin resin is a propylene polymer, and there can be used a homopolymer of propylene, and a random or block copolymer of propylene with other olefins such as ethylene, butene-1, or 2-methylpentene-1. The propylene polymer can be used in one kind or in two or more kinds in combination. It is desired that the propylene polymer contains the propylene in an amount of not less than 90% by weight.

(Barrier Resins)

The barrier resin that forms a dispersion phase in the formed body of the present invention has an MFR which lies in a range of 3 to 100 g/10 min. and, specifically, 5 to 95 g/10 min., the MFR being larger than the MFR of the polyolefin resin. It is important to so select the barrier resin that the ratio of MFR thereof to the MFR of the polyolefin resin lies in a range of 11 to 200 from the standpoint of forming the above-mentioned dispersion structure.

If the barrier resin has an MFR larger than the above range, it means that the viscosity is too low and may cause defective forming such as irregular flow, or the molecular weight is so low and may cause a decrease in the mechanical properties. If the barrier resin has an MFR smaller than the above range, on the other hand, the viscosity is so high that it may become difficult to conduct the forming.

As the barrier resin, there can be used those that have heretofore been widely used for the packing materials. As the gas barrier layer, there can be preferably used an ethylene-vinyl alcohol copolymer (EVOH) containing a vinyl alcohol unit in an amount of 40 to 85 mol % and, specifically, 55 to 80 mol %, and having a saponification degree of not less than 96 mol % and, specifically, not less than 99 mol %.

As the other gas barrier resins, further, there can be used nylon resins and, specifically, aliphatic nylons such as nylon 6, nylon 8, nylon 11, nylon 6,6, nylon 6,10, nylon 10,6, and nylon 6/6, 6 copolymer, as well as partly aromatic nylon such as polymetaxyleneadipamide, and polyglycol acid resin.

It is desired that these gas barrier resins have oxygen permeation coefficients of not more than $5.5 \times 10^{-12}$ cc·cm/cm$^2$·sec·cmHg (23° C., 0% RH).

The gas barrier resin can be imparted with property to absorb oxygen.

The gas barrier resin itself may be constituted so as to have oxygen-absorbing property, or the oxygen barrier resin may contain an organic component that can be oxidized.

As the gas barrier resin which by itself has oxygen-absorbing property, there can be exemplified those resins that can undergo the oxidation reaction. Namely, there can be used the oxidizing materials such as polybutadiene, polyisoprene, polypropylene, ethylene carbon oxide polymer, nylon 6, nylon 12, or polyamides such as polymetaxyleneadipamide having a terminal amino group concentration of not more than 50 eq/g to which there are added, as oxidizing catalyst, organic acid salts containing such a transition metal as cobalt, rhodium or copper, or to which there are added photosensitizers such as benzophene, acetophene or chloroketones. If these oxygen-absorbing materials are used, a further improved effect can be exhibited upon being irradiated with a ray of high energy such as ultraviolet ray or electron ray.

As the oxidizing organic component, further, there can be preferably used a polyene polymer derived from the polyene and to which a carboxylic acid group, a carboxylic anhydride group or a hydroxyl group has been introduced. As the functional groups, there can be exemplified acrylic acid, methacrylic acid, maleic acid, unsaturated carboxylic acid, anhydrous maleic acid and anhydride of an unsaturated carboxylic acid. As the transition metal catalyst, there can be preferably used cobalt.

Further, the oxygen barrier resin may be blended with an oxygen-absorbing agent. As the oxygen-absorbing agent, there can be used a metal powder having reducing property, such as reducing iron powder, reducing zinc, reducing tin powder, low metal oxide or reducing metal compound in one kind or in two or more kinds in combination as a chief component. As required, they can be used in combination with alkali metal, hydroxide of an alkaline earth metal, carbonate, sulfite, organic acid salt, halide or with such an assistant as activated carbon or activated alumina. Or there can be exemplified a high molecular compound having a polyhydric phenol in the skeleton thereof, such as polyhydric phenol-containing phenolaldehyde resin.

As the barrier resin, further, there can be used a cyclic olefin copolymer having water-barrier property.

(Resin Composition)

The resin composition of the invention has the above-mentioned specific melt flow rate, and contains the thermoplastic resin and the barrier resin in such amounts that the ratio of MFR thereof lies in a range of 11 to 200, i.e., contains the barrier resin in an amount of 30 to 300 parts by weight and, specifically, 40 to 100 parts by weight per 100 parts by weight of the thermoplastic resin.

The thermoplastic resin and the barrier resin can be dry-blended together or melt-blended together. For example, the dry-blending is attained by using the Henschel's mixer or the homo-mixer while the melt-blending is attained by using various kinds of kneaders, Bumbury's mixer, roll mixer, or monoaxial or biaxial extruder.

In the present invention, it is desired to dry-blend the resins together.

Depending on the use, the resin composition used in the invention can be blended with various coloring agents, filler, inorganic or organic reinforcing agent, lubricant, anti-blocking agent, plasticizer, leveling agent, surfactant, thickener, viscosity-decreasing agent, stabilizer, antioxidant, ultraviolet absorber, and compatibility-imparting agent according to known recipe. Specifically, the compatibility-imparting agent may be added in an attempt to improve the oxygen-barrier property and the mechanical properties of the polyolefin resin composition. As the compatibility-imparting agent, it is desired to use a modified olefin or a modified elastomer modified with maleic acid and, particularly desirably, to use a styrene type thermoplastic elastomer such as SEBS having an acid-modified group.

(Formed Bodies)

The formed body of the present invention comprises a layer of the above-mentioned resin composition which, as described earlier, is forming a layer structure in which the barrier resin is dispersed in the form of a lamellar dispersion phase stretching on one direction in a matrix of the thermoplastic resin. Here, it is important that the ratio (a)/(b) of an aspect ratio (a) in the dispersion phase of the barrier resin near the surface of the layer and an aspect ratio (b) in the dispersion phase of the barrier resin in the central portion in the direction of thickness of the layer, is not more than 2.0, preferably, 1.0 to 1.9 and, specifically, 1.1 to 1.9.

In the invention, the central portion in the direction of thickness of the layer stands for a range of 40 to 60% of the whole thickness of the layer that is regarded to be 100%, and the surface portion stands for the portions excluding the central portion.

The size of the dispersion phase cannot be definitely specified by utilizing the form or the thickness of the formed body. It is, however, desired that the size of the dispersion phase is such that the length of the long diameter is in a range of 5 to 300 μm.

According to the present invention, the formed body of even a single-layer structure of the above resin composition is capable of exhibiting excellent barrier property. It is, therefore, particularly desired that the formed body is of the single-layer structure. The formed body of the single-layer structure makes it possible to attain excellent productivity and advantage in economy.

There is no particular limitation on the thickness of the layer of the resin composition provided the thickness is enough for exhibiting barrier property as desired. In the case of a packing material, it is desired that the thickness is in a range of 100 μmm to 3 mm and, specifically, 300 μm to 3 mm.

In the present invention, it is desired that the formed body has the single-layer structure as described above from the viewpoint of productivity and economy. Not being limited thereto only, however, the formed body can be obtained in a multilayered structure having at least one such a layer.

The above multilayered structure may preferably be a multilayered structure comprising an intermediate layer of the above resin composition and the inner and outer layers of another thermoplastic resin, and a multilayered structure comprising the innermost layer of the above resin composition and a layer of another thermoplastic resin. The layer of the above resin composition may also be applied onto a base material of paper.

As the another thermoplastic resin, there can be preferably used the above-mentioned thermoplastic resins. Among them, it is desired to use the polyolefin resin that was used above as the polyolefin resin composition from the standpoint of interlayer adhesiveness. Not being limited thereto only, however, it is also allowable to use other thermoplastic resins that have heretofore been used as packing materials such as polyester resin, polyamide resin and the like. As required, further, there can be used such adhesives as polyamide adhesive and polyester adhesive, e.g., acid-modified polyolefin resin, ethylene vinyl acetate copolymer (EVA), and ethylene acrylicacid ester (EEA) according to known recipe.

There is no specific limitation on the form of the formed body of the present invention so far as it has at least a layer of a polyolefin resin composition that has the specific dispersion structure described above. Namely, the formed bodies of various forms that have heretofore been known, such as cap, tubular container, bottle, cup, tray, spout, pouch, sheet, film and the like, can be formed by the known methods such as injection forming, extrusion forming, compression forming or in-mold forming.

The formed body of the present invention is formed, specifically desirably, by the injection forming from the standpoint of forming the dispersion structure described above, the injection forming being conducted under the conditions of a resin composition temperature of 200 to 280° C., a metal mold temperature of 10 to 50° C. and an injection rate of 5 to 80 mm/sec.

EXAMPLES

The invention will be further described below with reference to the following Reference Examples, Examples and Comparative Examples to which only, however, the invention is in no way limited.

In the Reference Examples, Examples and Comparative Examples, the bodies were formed and measured by the methods described below.

(Measuring the Amount of Oxygen that has Permeated Through)

By using an oxygen permeability measuring apparatus (OX-TRAN (registered trademark) 2/21 manufactured by MOCON Co.), a spout that was formed (8 mm in mouth diameter, 1 mm thick in the body portion, 36 mm high) was measured under the conditions of a measuring temperature of 23° C. and 30% RH. The amount of oxygen that permeates through the formed spout a day was regarded as a reference and from which the unit of measurement was calculated as cc/pkg·day.

(Measuring the Aspect Ratios)

The cylindrical portion (FIG. 4) of the formed body was cut perpendicularly to the direction of thickness. By using the ultramicrotome manufactured by Leica Co., further, the body portion was cut with a glass knife in an atmosphere of −100° C. to obtain a smooth surface. By using an ion sputtering apparatus E-1045 (manufactured by Hitachi, Ltd.), the obtained smooth surface was subjected to a platinum vapor deposition treatment under the conditions of an electric current of 20 mA and a deposition time of 20 seconds. The smooth surfaces of the surface portion 4 of up to 0.2 mm from the surface layer and of the central portion 5 of from 0.4 mm up to 0.6 mm in the direction of the thickness (total thickness of 1 mm) of the formed spout, were observed at a magnification of 1000 times by using a scanning electron microscope "S-3400N manufactured by Hitachi High-Tech Co.". By using an image analysis-type grain size distribution software (Mac-view produced by Mountech Co.), the image data of the domain of the barrier resin (EVOH) obtained by using the electron microscope were analyzed for their aspect ratios in two arbitrarily selected areas over a square of 600 μm, and the EVOHs were all marked. By using mean values of the obtained values as an aspect ratio (aspect ratio (a)) of EVOH in the surface layer portion and as an aspect ratio (aspect ratio (b)) of EVOH of the central portion, the stretched degrees of the surface layer portion and the central portion of the EVOH that serves as domain were calculated, and a ratio (a)/(b) of the aspect ratios of the surface layer portion and the central portion was obtained.

Reference Example 1

Figure 4:
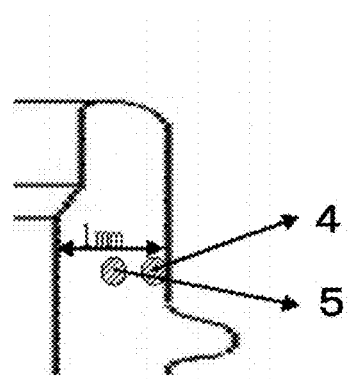
FIG. 4 is a sectional view of a mouth portion of a formed spout body obtained in Examples.
Figure 5:
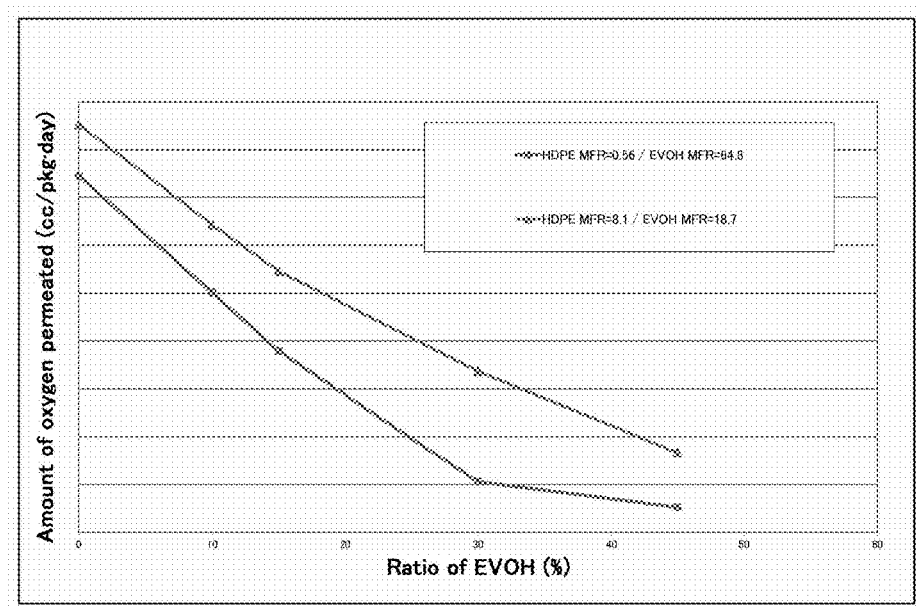
FIG. 5 is a graph showing relationships between the amount of the EVOH and the oxygen permeability using the formed bodies comprising the polyethylene resin compositions that contain EVOH having different MFRs in different amounts.

An ethylene-vinyl alcohol copolymer (EVOH) (ethylene content of 32 mol %) having an MFR of 84.8 g/10 min. as the barrier resin and a polypropylene (PP) (Novatec PP BC8: manufactured by Nihon Polypro Co.) having an MFR of 1.8 g/10 min. as the thermoplastic resin, were dry-blended together and were injection-formed to obtain a spout. FIG. 4 is a sectional view showing the mouth portion of the thus obtained spout. The blending ratios of EVOH/PP were 0/100, 10/90, 15/85, 30/70, 45/55, 50/50, and 70/30, and the injection forming was conducted under the conditions of a resin temperature of 210° C., a metal mold temperature of 15° C. and an injection rate of 20 mm/sec. Table 1 shows the measured amounts of oxygen that has permeated through the formed bodies.

Reference Example 2

Formed bodies were obtained in the same manner as in Reference Example 1 but using an EVOH (ethylene content of 32 mol %) having an MFR of 18.7 g/10 min. as the barrier resin, and were measured. Table 1 shows the measured amounts of oxygen that has permeated through the formed bodies.

Example 1

A formed body was obtained in the same manner as in Reference Example 1 but dry-blending together the EVOH used in Reference Example 1 and a PP (Noblen FH1016: manufactured by Sumitomo Chemicals Co.) having an MFR of 0.5 g/10 min. as the thermoplastic resin at a ratio of 30/70. Table 2 shows the amount of oxygen that has permeated through the formed body and the aspect ratio.

Example 2

A formed body was obtained in the same manner as in Example 1 but using an EVOH (ethylene content of 32 mol %) having an MFR of 6.7 g/10 min. as the barrier resin. The obtained formed body was measured for its properties. The results were as shown in Table 2.

Example 3

A formed body was obtained in the same manner as in Example 1 but using an EVOH (ethylene content of 32 mol %) having an MFR of 84.8 g/10 min. as the barrier resin and a PP (Novatec PP BC8: manufactured by Nihon Polypro Co.) having an MFR of 1.8 g/10 min. as the thermoplastic resin. The obtained formed body was measured for its properties. The results were as shown in Table 2.

Example 4

A formed body was obtained in the same manner as in Example 3 but using an EVOH (ethylene content of 38 mol %) having an MFR of 93.6 g/10 min. as the barrier resin. The obtained formed body was measured for its properties. The results were as shown in Table 2.

Example 5

A formed body was obtained in the same manner as in Example 1 but dry-blending together the EVOH used in Example 1, the PP, and the diethylmaleic acid-modified SEBS as the compatibility-imparting agent at a blending ratio of 30/68/2. The obtained formed body was measured for its properties. The results were as shown in Table 2.

Comparative Example 1

A formed body was obtained in the same manner as in Example 3 but using an EVOH (ethylene content of 32 mol %) having an MFR of 18.7 g/10 min. as the barrier resin. The obtained formed body was measured for its properties. The results were as shown in Table 2.

Comparative Example 2

A formed body was obtained in the same manner as in Example 1 but using a PP (Novatec PP BCO3C: manufactured by Nihon Polypro Co.) having an MFR of 30 g/10 min. as the thermoplastic resin. The obtained formed body was measured for its properties. The results were as shown in Table 2.

TABLE 1

| | EVOH Ethylene content (mol %) | EVOH MFRb | PP MFRm | EVOH/PP MFRb/MFRm | Amount of oxygen permeated (cc/pkg · day) at EVOH/PP ratios of | | | | | | |
|---|---|---|---|---|---|---|---|---|---|---|---|
| | | | | | 1/100 | 10/90 | 15/85 | 30/70 | 45/55 | 50/50 | 70/30 |
| Ref. Ex. 1 | 32 mol % | 84.8 | 1.8 | 47.1 | 0.0147 | 0.0110 | 0.0086 | 0.0024 | 0.0015 | 0.0009 | 0.0002 |
| Ref. Ex. 2 | 32 mol % | 18.7 | 1.8 | 10.4 | 0.0147 | 0.0107 | 0.0084 | 0.0045 | 0.0019 | 0.0013 | 0.0003 |

TABLE 2

| | EVOH Ethylene content (mol %) | EVOH MFRb | PP MFRm | EVOH/PP MFRb/MFRm | Blending ratio | Amount of oxygen permeated (cc/pkg · day) | Aspect ratio (a)* | (b)* | (a)/(b) |
|---|---|---|---|---|---|---|---|---|---|
| Ex. 1 | 32 mol % | 84.8 | 0.5 | 169.6 | 30/70 | 0.0006 | 3.25 | 2.92 | 1.1 |
| Ex. 2 | 32 mol % | 6.7 | 0.5 | 13.4 | 30/70 | 0.0032 | 2.97 | 1.69 | 1.8 |
| Ex. 3 | 32 mol % | 84.8 | 1.8 | 47.1 | 30/70 | 0.0024 | 3.65 | 1.91 | 1.9 |
| Ex. 4 | 38 mol % | 93.6 | 1.8 | 52.0 | 30/70 | 0.0030 | 2.71 | 1.64 | 1.7 |
| Ex. 5 | 32 mol % | 84.8 | 1.8 | 47.1 | 30/68/2 | 0.0026 | 2.98 | 1.80 | 1.7 |
| Comp. Ex. 1 | 32 mol % | 18.7 | 1.8 | 10.4 | 30/70 | 0.0045 | 3.78 | 1.53 | 2.5 |
| Comp. Ex. 2 | 32 mol % | 84.8 | 30 | 2.8 | 30/70 | 0.0045 | 3.08 | 1.45 | 2.1 |

(a)*: (a) Surface layer portion
(b)*: (b) Central portion (Consideration)

As will be obvious from the results of Reference Examples 1 and 2, it was confirmed that the oxygen barrier property could be improved by controlling the viscosities of EVOH.

As will be obvious from Reference Examples, Examples and Comparative Examples, the oxygen barrier property could be improved by controlling the ratio of blending the PP and EVOH, by controlling the difference in the viscosities and by decreasing the ratio of aspect ratios of the surface layer portions and the central portion.

In Examples 1 and 2, the EVOH stretched in the central portion and favorable oxygen barrier property could be obtained. Example 3 provided favorable oxygen barrier property despite there was used the same PP as that of Comparative Example 1.

This was probably due to that since there was used the EVOH having a low viscosity, the degree of stretching was improved in the central portion of the formed body. Example 4 provided barrier property better than that of Comparative Example 1 despite there was used the EVOH of an ethylene content of 38 mol % having an oxygen barrier property lower than that of the EVOH of an ethylene content of 32 mol %, suggesting that important roles were played by a difference in the viscosity between the PP and the EVOH, and by the EVOH that stretched in the central portion of the formed body. Example 5 provided oxygen barrier property better than that of Example 4 due to fine dispersion effect of the compatibility-imparting agent. The formed body, too, exhibited improved mechanical properties.

Comparative Example 1 could not exhibit oxygen barrier property so much as in Examples. The cause was presumably due to a small difference in the viscosity between the EVOH and the PP, and poor stretching of the EVOH in the central portion of the formed body. In Comparative Example 2, the difference in the viscosity between the PP and the EVOH was smaller than that in Comparative Example 1, but no difference was seen in the oxygen barrier property.

Reference Example 3

An EVOH (ethylene content of 32 mol %) having an MFR of 84.8 g/10 min. as the barrier resin and a high-density polyethylene (HDPE) (SP7005: manufactured by Prime Polymer Co.) having an MFR of 0.56 g/10 min. as the thermoplastic resin, were dry-blended together and were injection-formed to obtain a spout. The blending ratios of EVOH/HDPE were 0/100, 10/90, 15/85, 30/70, 45/55, and the injection forming was conducted under the conditions of a resin temperature of 210° C., a metal mold temperature of 15° C. and an injection rate of 20 mm/sec. Table 3 shows the measured amounts of oxygen that has permeated through the formed bodies.

Reference Example 4

An EVOH (ethylene content of 32 mol %) having an MFR of 18.7 g/10 min. as the barrier resin and a high-density polyethylene (HDPE) (2100K: manufactured by Prime Polymer Co.) having an MFR of 8.1 g/10 min. as the thermoplastic resin, were dry-blended together and were injection-formed to obtain a spout. Table 3 shows the measured amounts of oxygen that has permeated through the formed bodies.

Example 6

The formed bodies obtained in Reference Example 3 were measured for their properties. The results were as shown in Table 4.

Example 7

A formed body was obtained in the same manner as in Example 6 but using an EVOH (ethylene content of 32 mol %) having an MFR of 6.7 g/10 min. as the barrier resin. The obtained formed body was measured for its properties. The results were as shown in Table 4.

Example 8

A formed body was obtained in the same manner as in Example 6 but using an HDPE (2100K: manufactured by Prime Polymer Co.) having an MFR of 8.1 g/10 min. as the thermoplastic resin. The obtained formed body was measured for its properties. The results were as shown in Table 4.

Comparative Example 3

A formed body was obtained in the same manner as in Example 8 but using an EVOH (ethylene content of 32 mol %) having an MFR of 6.7 g/10 min. as the barrier resin. The obtained formed body was measured for its properties. The results were as shown in Table 4.

Comparative Example 4

A formed body was obtained in the same manner as in Example 6 but using an HDPE (J300: manufactured by Asahi Kasei Chemicals Co.) having an MFR of 77 g/10 min. as the thermoplastic resin. The obtained formed body was measured for its properties. The results were as shown in Table 4.

TABLE 3

| | EVOH | | | EVOH/ | Amount of oxygen permeated (cc/pkg · day) at EVOH/HDPE ratios of | | | | | | |
|---|---|---|---|---|---|---|---|---|---|---|---|
| | Ethylene content (mol %) | MFR (g) | HDPE MFR (g) | HDPE MFR ratio | 1/100 | 10/90 | 15/85 | 30/70 | 45/55 | 50/50 | 70/30 |
| Ref. Ex. 3 | 32 mol % | 84.8 | 0.56 | 151.4 | 0.0074 | 0.0050 | 0.0038 | 0.0011 | 0.0005 | — | — |
| Ref. Ex. 4 | 32 mol % | 18.7 | 8.1 | 2.3 | 0.0085 | 0.0064 | 0.0055 | 0.0034 | 0.0017 | — | — |

TABLE 4

| | EVOH | | HDPE | EVOH/HDPE | | Amount of oxygen permeated | Aspect ratio | | |
|---|---|---|---|---|---|---|---|---|---|
| | Ethylene content (mol %) | MFR (g) | MFR (g) | MFR ratio | Blending ratio | (cc/pkg · day) | (a)* | (b)* | (a)/(b) |
| Ex. 6 | 32 mol % | 84.8 | 0.56 | 151 | 30/70 | 0.0011 | 3.14 | 2.60 | 1.2 |
| Ex. 7 | 32 mol % | 6.7 | 0.56 | 12 | 30/70 | 0.0022 | 3.80 | 2.82 | 1.3 |
| Ex. 8 | 32 mol % | 84.8 | 8.1 | 10.5 | 30/70 | 0.0020 | 4.63 | 2.70 | 1.7 |
| Comp. Ex. 3 | 32 mol % | 6.7 | 8.1 | 0.8 | 30/70 | 0.0026 | 4.24 | 1.84 | 2.3 |
| Comp. Ex. 4 | 32 mol % | 84.8 | 77 | 1.1 | 30/70 | 0.0031 | 3.63 | 1.53 | 2.4 |

(a)*: (a) Surface layer portion
(b)*: (b) Central portion (Consideration)

As will be obvious from the results of Reference Examples 3 and 4, it was confirmed that when the high-density polyethylene was used, too, the oxygen barrier property could also be improved by controlling the viscosity of the EVOH like when the polypropylene was used.

When the high-density polyethylene was used, too, like when the polypropylene was used, the oxygen barrier property could be improved by controlling the ratio of blending the HDPE and EVOH, by controlling the difference in the viscosity and by decreasing the ratio of aspect ratios of the surface layer portions and the central portion.

In Comparative Examples 3 and 4, the oxygen barrier property could not be exhibited to such an extent as that in Examples. The causes were due to a small difference in the viscosity between the EVOH and the HDPE, and poorly stretched EVOH in the central portion of the formed bodies.

INDUSTRIAL APPLICABILITY

The formed body of the present invention exhibits excellent barrier property despite of its single-layer structure. Namely, the formed body can be realized in a single-layer structure though it so far had to be formed in a multilayer structure to ensure barrier property offering, therefore, advantage in formability, productivity and economy, and lending itself well for being formed into general purpose products.

Specifically, the formed bodies such as spouts so far had to be formed in a multilayer structure through the insert forming. However, the formed bodies of this kind can now be produced maintaining good productivity and economy without impairing barrier property.

DESCRIPTION OF REFERENCE NUMERALS 1 matrix
2 lamellar dispersion phase
3 circular dispersion phase
4 surface layer portions
5 central portion

The invention claimed is:

1. An injection-formed body having a layer of a resin composition constituted by a polyolefin resin and a barrier resin, wherein:
   the barrier resin is an ethylene-vinyl alcohol copolymer;
   the layer of said resin composition forms, in a matrix of the polyolefin resin, a layer structure in which the barrier resin is dispersed in the form of a lamellar dispersion phase stretching in one direction;
   an aspect ratio (a) of the dispersion phase of the barrier resin in a surface portion near the surfaces of the layer is 2.5 to 4.0, an aspect ratio (b) of the dispersion phase of the barrier resin in the central portion in the direction of thickness of the layer is 1.6 to 3.0, a ratio (a)/(b) of the aspect ratio (a) and the aspect ratio (b) is 1.1 to not more than 2.0, the central portion in the direction of thickness of the layer stands for a range of 40 to 60% of the whole thickness of the layer that is regarded to be 100%, and the surface portion stands for the portions excluding the central portion;
   the melt flow rate (MFRm) of said polyolefin resin is 0.1 to 1.8 g/10 min., while the melt flow rate (MFRb) of said barrier resin is 84.8 to 93.6 g/10 min., and the ratio (MFRb/MFRm) of the melt flow rate (MFRb) of said barrier resin and the melt flow rate (MFRm) of said polyolefin resin is 11 to 200.

2. The injection-formed body according to claim 1, wherein said resin composition is blended with the barrier resin in an amount of 30 to 300 parts by weight per 100 parts by weight of the polyolefin resin.

3. The injection-formed body according to claim 1, wherein said polyolefin resin is polypropylene resin.

* * * * *